UNITED STATES PATENT OFFICE.

JOSHUA MERRILL, OF BOSTON, MASSACHUSETTS.

IMPROVED MODE OF PURIFYING HYDROCARBON OILS.

Specification forming part of Letters Patent No. 43,325, dated June 28, 1864.

*To all whom it may concern:*

Be it known that I, JOSHUA MERRILL, of the city of Boston, in the county of Suffolk and State of Massachusetts, have invented a new and useful improvement in the process of purifying oils distilled from petroleums, bituminous coals, bituminous shales, and other substances producing hydrocarbon oils; and I do hereby declare that the following is a full and correct description thereof.

In the manufacture of oils from petroleum, bituminous coal, and other substances from which hydrocarbon oils are produced, commonly called "kerosine-oils," it has been the practice to treat the distillate of the crude oil with sulphuric acid for the purpose of neutralizing and removing matters which, if not removed or neutralized, emit offensive odors; and it has also been the practice to wash out the acid from the oil with warm water, and also to treat the oil afterward with caustic soda or carbonate soda to remove matters which those substances are capable of removing. As this treatment of the oil with sulphuric acid is well known, also the after-treatment with caustic or carbonate alkalies, I will not here attempt to describe it in detail. It has the effect to prevent the oil from emitting disagreeable odors; but there are objectionable results, which are supposed to arise from the use of the sulphuric acid, a portion of which remains in the oil, from which it is liberated while burning, causing diminution of illuminating power, also incrustation of the wick. Whether the above-mentioned theory is correct or not, the fact is well known that oil treated with sulphuric acid loses illuminating power, and were it not for the fetid odors of the unpurified oil the latter would be used in preference.

My said invention and improvement in said process of purification consists in treating said oils with sulphate of soda, commonly called "Glauber's salt," instead of sulphuric acid, as formerly practised.

I carry on my improved process as follows—viz: I place the oil to be used in the common lead-lined agitator-vessel provided with a twirl, a draw-off cock at the bottom, and a steam-pipe connected with a steam-boiler, which opens into the bottom of the agitator-vessel for the purpose of injecting steam into the oil to warm it. After heating the oil by injected steam to about 120° Fahrenheit I allow about half an hour for the water, which has mixed with the oil by condensation of the steam, to settle, and then draw it off clearly as possible at the bottom. The degree of heat is not essential, but I prefer to heat to about 120° Fahrenheit, as mentioned. I next stir the oil violently, adding about one per cent. in quantity of a solution of sulphate of soda of 18° Baumé, and continue to stir violently for one and a half hours, after which I allow half an hour rest to settle, and then carefully draw off the sludge. I now wash the oil with about five per cent. of water heated to 130° Fahrenheit. I stir in this water thoroughly with the twirl for five minutes, then suffer it to subside, and draw it off carefully. I now treat the oil with a solution of about one per cent. of either caustic or carbonate soda of a strength of 12° Baumé for the purpose of removing such undesirable matters as are removable by alkalies. This I stir violently for one hour and a half, and then after a half-hour's rest carefully draw off the alkali and impurities which will have settled to the bottom. I then wash the oil with five per cent. of water at 130° Fahrenheit, or about that temperature, and after thorough washing allow the water three or four hours to settle. I then draw off the water carefully, and the process is finished. The oil is now fit for market, of a brilliant color, and burns splendidly.

It will be evident to those practically acquainted with such operations that variations may be made in the quantity of the chemicals used, and in the time and temperature of the different steps of the above-described process, without essentially changing the nature of my improvement, which is to treat the oil with sulphate of soda instead of sulphuric acid, as formerly practised. A small quantity of either caustic soda or carbonate of soda—say one-quarter of one per cent. of the oil—may be added to the mixture of the oil and sulphate of soda before the close of the agitation with the sulphate of soda, if desired. The oil finished by the above treatment is superior to oils finished by sulphuric-acid treatment in burning qualities.

I claim as my invention and improvement—

1. In the process of purifying hydrocarbon oils, treating them, substantially as hereinbefore described, with sulphate of soda for the purpose substantially as hereinbefore set forth.

2. In combination with the treatment by sulphate of soda in said process, the use of caustic or carbonate alkalies, substantially as described.

JOSHUA MERRILL.

Witnesses:
GEO. W. CARTER,
LUCIUS H. PEASLEE.